United States Patent
Tan et al.

(10) Patent No.: US 9,980,095 B2
(45) Date of Patent: May 22, 2018

(54) METHOD AND APPARATUS FOR PROVIDING COUNTRY DETECTION ON CELLULAR DEVICES USING CELL TOWER INFORMATION

(71) Applicant: Google Inc., Mountain View, CA (US)

(72) Inventors: Weihua Tan, Fremont, CA (US); Shishir Kumar Agrawal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/077,537

(22) Filed: Mar. 22, 2016

(65) Prior Publication Data

US 2017/0280295 A1    Sep. 28, 2017

(51) Int. Cl.
*H04W 4/02* (2018.01)
*H04W 8/20* (2009.01)
*H04M 1/725* (2006.01)

(52) U.S. Cl.
CPC ....... *H04W 4/025* (2013.01); *H04M 1/72572* (2013.01); *H04W 8/205* (2013.01)

(58) Field of Classification Search
CPC .. H04W 4/025; H04W 8/205; H04M 1/72572
See application file for complete search history.

(56) References Cited

U.S. PATENT DOCUMENTS

| | | |
|---|---|---|
| 6,381,315 B1 | 4/2002 | Nhaissi |
| 7,180,898 B2 | 2/2007 | Yoshida et al. |
| 7,433,929 B2 | 10/2008 | Guilford et al. |
| 7,809,360 B2 | 10/2010 | Agrawal et al. |
| 8,391,192 B2 | 3/2013 | Prakash et al. |
| 8,484,568 B2 | 7/2013 | Rados et al. |

(Continued)

FOREIGN PATENT DOCUMENTS

| EP | 1885144 A2 | 2/2008 |
|---|---|---|
| EP | 2244501 A1 | 10/2010 |

(Continued)

OTHER PUBLICATIONS

Sensorly, "With Sensorly you can . . . " www.sensorly.com, accessed Apr. 21, 2016.

(Continued)

*Primary Examiner* — Brandon J Miller
(74) *Attorney, Agent, or Firm* — Faegre Baker Daniels LLP (57) ABSTRACT

An electronic mobile device that supports a subscriber identification module (SIM) profile scans a base station cell that is associated with a different SIM profile in response to an inability to connect with a wireless network associated with the electronic mobile device's SIM profile. The electronic mobile device obtains cell information from the base station cell associated with the different SIM profile in response to the scanning. The cell information may include country associated data such as Mobile Country Code (MCC) or a System Identification (SID) data. Based on the obtained cell information, the electronic mobile device determines a current geographic location. The electronic mobile device may then adjust operation of a service, such as an application, of the electronic mobile device based on the determined country. Corresponding methods are also described.

20 Claims, 7 Drawing Sheets

(56) References Cited

U.S. PATENT DOCUMENTS

| | | | |
|---|---|---|---|
| 8,590,023 | B2 | 11/2013 | Gupta et al. |
| 8,831,628 | B2* | 9/2014 | Rao ................... H04W 64/00 455/456.1 |
| 9,491,693 | B1* | 11/2016 | Chuttani ............. H04W 48/16 |
| 9,497,705 | B2* | 11/2016 | Nayak ............. H04W 52/0229 |
| 2002/0169716 | A1 | 11/2002 | Johnson et al. |
| 2004/0246920 | A1 | 12/2004 | Savolainen |
| 2007/0037550 | A1 | 2/2007 | Armstrong |
| 2007/0147317 | A1 | 6/2007 | Smith et al. |
| 2008/0009279 | A1 | 1/2008 | Sakawa |
| 2008/0107051 | A1 | 5/2008 | Chen et al. |
| 2009/0061862 | A1 | 3/2009 | Alberth, Jr. et al. |
| 2009/0215449 | A1* | 8/2009 | Avner ................... H04W 8/06 455/433 |
| 2009/0298467 | A1 | 12/2009 | Zohar |
| 2010/0304737 | A1 | 12/2010 | Jain et al. |
| 2011/0096673 | A1 | 4/2011 | Stevenson et al. |
| 2011/0306318 | A1 | 12/2011 | Rodgers et al. |
| 2012/0014271 | A1 | 1/2012 | Damenti |
| 2012/0052914 | A1 | 3/2012 | Yaqub et al. |
| 2012/0094653 | A1 | 4/2012 | Okuda |
| 2012/0195223 | A1 | 8/2012 | Raleigh |
| 2012/0282915 | A1 | 11/2012 | Haynes et al. |
| 2013/0007039 | A1* | 1/2013 | Edara ................... H04W 48/16 707/769 |
| 2013/0148567 | A1 | 6/2013 | Efrati et al. |
| 2013/0155842 | A1 | 6/2013 | Moore et al. |
| 2013/0157638 | A1* | 6/2013 | Malmbak ............. H04W 4/001 455/418 |
| 2013/0203438 | A1* | 8/2013 | Shin ................... H04W 64/003 455/456.1 |
| 2015/0098393 | A1 | 4/2015 | Tofighbakhsh et al. |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0205527 | A1* | 7/2016 | Hui ................... H04W 4/021 455/404.2 |
| 2016/0261596 | A1 | 9/2016 | Khello et al. |

FOREIGN PATENT DOCUMENTS

| | | |
|---|---|---|
| WO | 2002-041580 A1 | 5/2002 |
| WO | 2004-047476 A1 | 6/2004 |
| WO | 2006-005947 A1 | 1/2006 |
| WO | 2008/060464 A2 | 5/2008 |
| WO | 2011-162688 A1 | 12/2011 |
| WO | 2014-011094 A1 | 1/2014 |
| WO | 2015/158263 A1 | 10/2015 |

OTHER PUBLICATIONS

Bircher et al., "An Agent-Based Architecture for Service Discovery and Negotiation in Wireless Networks," University of Bern, Wired/Wireless Internet Comms. (WWIC), Jan. 21, 2004.

Silverman, Dwight, "Thinking of changing cellphone carriers? Check this app first," http://blog.chron.com/techblog/2011/06/thinking-of-changing-cellphone-carriers-check-this-app-first/, Houston Chronicle Techblog, Jun. 15, 2011.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Nikravesh et al., "Mobile Network Performance from User Devices: A Longitudinal, Multidimensional Analysis," Passive and Active Measurement: 15th International Conference, PAM 2014, Mar. 10-11, 2014.

Venkiteswaran, Sriram, "Google Project Fi—New Era for Mobile Technology?", http://blog.mojonetworks.com/google-project-fi-new-era-for-mobile-technology, MojoBlog, May 19, 2015.

Movirtu, "Virtual SIM Platform: Decoupling the identity from the SIM card," www.movirtu.com/#!worklife-virtual-sim-platform/cuml, accessed Mar. 22, 2016.

Aptilo Networks, "Innovative Wi-Fi Offload Features," www.aptilo.com/mobile-data-offloading/innovative-wifi-offload-features, accessed Mar. 22, 2016.

Alcatel Lucent, "7750 Service Router Mobile Offload," Mar. 2016.

Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.

Ericsson et al.: "Analysis of WLAN-3GPP interworking solutions", 3GPP Draft; R2-131388—Analysis of WLAN 3GPP Interworking Solutions, 3rd Generation Partnership Project (3GPP), Mobile Competence Centre; vol. RAN WG2; Apr. 6, 2013.

Aptilo Inc.; "EAP-SIM and EAP-AKA authentication for mobile devices"; from https://web.archive.org/web/20160303105429/https://www.aptilo.com/aptilo-eap-sim-authentication-server/eap-sim-ada; Mar. 3, 2016.

Aptilo Inc.; "Innovative Wi-Fi Offload features"; from https://web.archive.org/web/20160303095650/https://www.aptilo.com/mobile-data-offloading/innovative-wifi-offload-features; Mar. 3, 2016.

* cited by examiner

METHOD AND APPARATUS FOR PROVIDING COUNTRY DETECTION ON CELLULAR DEVICES USING CELL TOWER INFORMATION

BACKGROUND OF THE DISCLOSURE

An electronic mobile device (e.g., a wireless mobile device), such as a cell phone, a tablet, or other electronic mobile device, today is able to determine its location when it's connected to a network such as the Global Positioning System (GPS) or to a network that provides an Internet connection. Networks that allow Internet connections may include wireless wide area networks (WWAN) such as cellular networks that communicate using radio access technologies (RATs such as Global System for Mobiles (GSM), Code Division Multiple Access (CDMA), 4G LTE or other radio access technologies) as well as wireless local area networks (WLAN) such as Wi-Fi networks. Based on information obtained from these networks, an electronic mobile device may determine which country it is located in. When an electronic mobile device determines which country it is located in, the electronic mobile device may adjust one of its services (e.g., application, operating system (OS) task). For example, the electronic mobile device may display the country the mobile device is located in when the mobile device enters a new country.

Assuming an electronic mobile device is equipped with operable GPS supporting equipment, an electronic mobile device is able to obtain its latitude and longitude positions via GPS. The electronic mobile device may then determine which country it is in by mapping the latitude and longitude to a particular country (e.g., United States of America). For example, the electronic mobile device may access an Internet based server to determine its country location based on the obtained latitude and longitude positions. However, determining a country of an electronic mobile device via GPS presents various issues. For example, to receive latitude and longitude positions from the GPS, the GPS supporting equipment associated with the electronic mobile device must be turned on and thus consumes battery power. In addition, the electronic mobile device must still map the obtained latitude and longitude positions to a country, which as mentioned above, may be performed by a server lookup which will require an Internet connection.

Another option, for an electronic mobile device that is connected to and registered with a base station (e.g., eNB), to determine its country location is to scan a base station cell of the base station for a country code. The country code may be included in cell information that is transmitted by the base station. For example, as known in the art, a base station may provide one or more base station cells, where each base station cell provides network access over a geographic region. For example, a country code may be included in cell information that is transmitted by a base station over a base station cell. As known in the art, a SIM profile, typically associated with a SIM card, allows a subscriber to identify and authenticate with a network. For example, an electronic mobile device with a subscriber identification module (SIM) profile that is compatible with a SIM profile associated with a base station cell may scan the base station cell to obtain the country code. Because the country code indicates a country associated with the base station cell, the electronic mobile device is able to determine the country it's located in. This solution, however, also presents various issues. For example, the electronic mobile device must be registered with the base station providing the country code. If the electronic mobile device is not registered, the electronic mobile device is unable to obtain the country code, as the country code is unavailable to unregistered devices. In addition, depending on the WWAN that the base station provides access to, country code information may not be available. As another option, an electronic mobile device connected to a network, such as WWAN or WLAN network, that provides an Internet connection may also be able to determine its location based on an Internet Protocol (IP) address. For example, if connected to a WWAN providing Internet access, an electronic mobile device may query an Internet based server to determine which country its assigned IP address belongs to.

These solutions, however, also present various issues. First, these solutions require an Internet connection. In addition, if the electronic mobile device receives a new IP address, the electronic mobile device would need to re-query an Internet based server to determine which country the new IP address is associated with. This re-querying, however, consumes battery power of the electronic mobile device. Moreover, electronic mobile devices may be located in an area such that they have no working connection, e.g., no Wi-Fi connection, or no wireless network supporting a compatible SIM profile. As such, there are opportunities for determining a country location of, and providing country detection to, an electronic mobile device.

SUMMARY OF THE DISCLOSURE

The disclosure relates generally to apparatus and methods that provide country detection on an electronic mobile device and more particularly to apparatus and methods for providing country detection on an electronic mobile device that employs one or more subscriber identification module profiles. The apparatus and methods provide country detection to an electronic mobile device when the electronic mobile device is not connected and registered with a base station. For example, the apparatus and methods allow an electronic mobile device with a SIM profile to scan a base station cell provided by a base station with a different SIM profile. The electronic device is unable to register with the base station providing the base station cell because the SIM profiles are not compatible. The apparatus and methods allow the electronic mobile device to determine its country location based on cell information obtained from the scan. The apparatus and methods allow the electronic mobile device to adjust applications executing on the electronic mobile device based on the country location, even though the electronic mobile device is not connected and registered with a base station.

Briefly, an electronic mobile device that supports a subscriber identification module (SIM) profile scans a base station cell that is associated with a different SIM profile in response to an inability to connect with a wireless network associated (e.g., compatible) with the electronic mobile device's SIM profile. For example, because the SIM profiles of the electronic mobile device and the base station cell are not compatible (e.g., different), the electronic mobile device is unable to connect and register with the base station cell. The electronic mobile device obtains cell information from the base station cell associated with the different SIM profile in response to the scanning. The cell information may include country associated data such as Mobile Country Code (MCC) or a System Identification (SID) data. For example, base stations operating in a Global System for Mobiles (GSM) network may provide a MCC, while base stations operating in a Code Division Multiple Access (CDMA) network may provide a SID. A MCC is a three digit number that represents a particular country, while the SID is a 64 bit integer where a wireless carrier is assigned one or more SIDs. As such, the electronic mobile device may extract country associated data, such as MCC data or SID data, from the obtained cell information. Based on the obtained cell information, the electronic mobile device determines a current geographic location (e.g., current country location). The electronic mobile device may then adjust operation of a service, such as an application, of the electronic mobile device based on the determined geographic location. Corresponding methods are also described.

In one example, the electronic mobile device employs a country code map that maps a plurality of ranges of country associated data to a particular country. The country code map may include, for example, one or more ranges of MCC data or SID data, where the ranges are mapped to a particular country. The electronic mobile device may determine a current country location based on obtained cell information and based on the country code map. For example, an electronic mobile device with a SIM profile may obtain country associated data from a base station cell associated with an incompatible SIM profile. The electronic mobile device may compare the country associated data with one or more ranges of country associated data in a country code map to determine a range in which the country associated data falls within. For example, the electronic mobile device may determine that obtained country associated data falls within at least one range of a country code map's plurality of ranges of country associated data. Based on the comparison, the electronic mobile device may determine its current country location. In one example, the electronic device determines that the obtained cell information includes MCC data. The electronic device determines its current country location based on the obtained MCC data, and based on one or more MCC data ranges of the country code map. In another example, the electronic device determines that the obtained cell information includes SID data. The electronic device determines its current country location based on the obtained SID data, and based on one or more SID data ranges of the country code map.

In one embodiment, an electronic mobile device that includes a SIM profile associated with a wireless network obtains (e.g., receives) country associated data, such as MCC or SID information, for a plurality of countries when connected to a base station cell associated with a compatible SIM profile. For example, the electronic mobile device may obtain the country associated data from a server accessible via the Internet (e.g., a cloud-based server). The electronic mobile device may generate a country code map that maps a plurality of ranges of the country associated data to a particular country based on the obtained country associated data. For example, while the server may provide multiple country associated datum for each country, the country code map includes ranges of the country associated datum for each country. The electronic mobile device may then utilize the generated country code map to determine a current country location when the electronic mobile device is not connected to a wireless network with a compatible SIM profile.

In one example, the generated country code map is stored in memory. The electronic mobile device may access the country code map in memory to compare obtained cell information to at least one range of the plurality of ranges of country associated data mapped by the country code map. The electronic mobile device may then determine a current country location based on the comparison of the obtained cell information to the at least one range of the plurality of ranges of country associated data mapped by the country code map. A user's current country location is detected, used, or stored only after receiving explicit authorization from the user to do so. In one embodiment, the electronic mobile device notifies at least one service of its determined current country location, and may store an indication of the determined current country location in memory. The electronic mobile device may adjust operation of the notified service, while the electronic device is not connected to a wireless network with a compatible SIM profile, using the stored indication. For example, while the electronic device is not connected to a wireless network with a compatible SIM profile, the electronic mobile device may notify an application that the electronic device is located in a different (e.g., new) country. The application may then, for example, provide for display on the electronic mobile device the different country.

In one example, an electronic mobile device that includes at least a first SIM profile associated with a first wireless network and includes a means for scanning at least one base station cell associated with a second and different SIM profile in response to an inability to connect with the first wireless network; a means for obtaining cell information in response to scanning the at least one base station cell associated with the second and different SIM profile; a means for determining a current country location of the electronic mobile device based on the cell information obtained from the at least one base station cell associated with the second and different SIM profile; and a means for adjusting operation of at least one service of the electronic mobile device based on the determined current country location. A user's current country location is detected, used, or stored only after receiving explicit authorization from the user to do so.

In one embodiment, the electronic device includes a means for receiving country associated data for a plurality of countries from a base station cell with a SIM profile compatible with the at least first SIM profile; a means for generating a country code map that maps a plurality of ranges of the country associated data to a particular country of the plurality of countries; and a means for determining, while the electronic mobile device is not connected to the first wireless network, the current country location of the electronic mobile device based on the generated country code map that maps the range of country associated data to a particular country of the plurality of countries. In another embodiment, the electronic device includes a means for accessing a country code map that maps a plurality of ranges of country associated data to a particular country of the plurality of countries in memory; a means for comparing obtained cell information to at least one range of the plurality of ranges of country associated data mapped by the country code map; and a means for determining a current country location based on the comparison of the obtained cell information to the at least one range of the plurality of ranges of country associated data mapped by the country code map. In yet another example, the electronic device includes a means for determining that the obtained cell information falls within at least one range of the plurality of ranges of country associated data mapped by the country code map.

In one example, the electronic device includes a means for notifying at least one service of the determined current country location of the electronic mobile device; a means for storing an indication of the determined current country location of the electronic mobile device in memory; and a means for adjusting the operation of the at least one service of the electronic mobile device, while the electronic mobile device is not connected to the first wireless network, using the stored indication of the determined current country location of the electronic mobile device. A user's current country location is detected, used, or stored only after receiving explicit authorization from the user to do so.

In another example, the electronic mobile device includes a means for determining that cell information obtained from a base station cell associated with a second and different SIM profile comprises Mobile Country Code (MCC) data; and a means for determining a current country location of the electronic mobile device based on the MCC data. In yet another example, the electronic mobile device includes a means for determining that the cell information obtained from the base station cell associated with the second and different SIM profile comprises System Identification (SID) data; and a means for determining the current country location of the electronic mobile device based on the SID data.

Among other advantages, an electronic mobile device may determine a current country location even while not connected to and registered with a base station. Moreover, detection of the current country location does not require Internet connectivity, as the determination is based on information obtained from a base station cell. As another advantage, the described approaches to detecting a current country location of an electronic mobile device require little additional power (e.g., battery power) as electronic mobile devices typically scan base station cells as part of their operating procedure. In addition, a current country location may be detected as quickly as a base station cell scan is performed, where a scan may be performed multiple times within a minute. Persons of ordinary skill in the art would recognize other advantages as well.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Exemplary embodiments provide a technical solution that addresses, for example, the problem of determining a country location of an electronic mobile device when the electronic mobile device is unable to register with a network, such as when the electronic device does not include a SIM profile that is compatible with an available network. In addition, the exemplary embodiments do not require an Internet connection to determine a country location, thus allowing the electronic device to determine a country location even when not connected to a network that allows access to the Internet. As such, the embodiments allow the electronic mobile device to determine a country location even when the electronic mobile has no working connection.

Figure 1:
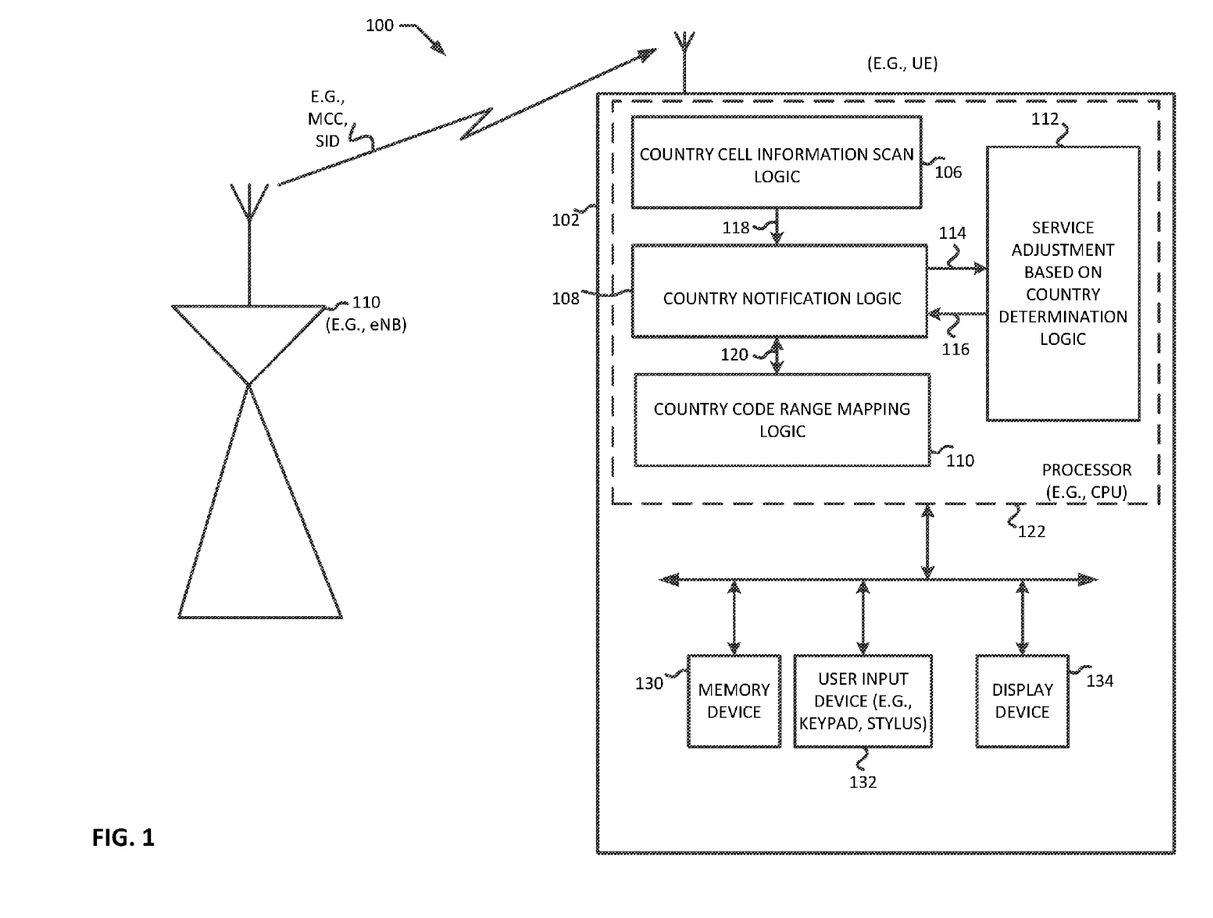
FIG. 1 is a block diagram generally illustrating one example of a communication environment employing a wireless communication device and a base station in accordance with one example set forth in the disclosure.

Turning to the drawings, although implementations may be disclosed with respect to country detection, other implementations could be used to detect other geographical segments, such as city detection, county detection, or detection of any other geographical segment. FIG. 1 illustrates one example of a communication environment 100 that includes an electronic mobile device 102 that is operable to receive transmissions from base station 110 while in the coverage area of a base station cell provided by base station 110. Base station 110 may be operable to provide a wireless network (not shown) over one or more base station cells where the base station cells are associated with a SIM profile. The wireless network may be any suitable wireless network that is operated by a carrier such as a GSM network, CDMA network, or any other suitable WWAN network. Electronic mobile device 102 includes any suitable radio access technology interface circuitry and control circuitry to allow communication with wireless networks as known in the art. Electronic mobile device 102 may include one or more SIM profiles where the one or more SIM profiles may not compatible with the SIM profiled associated with the base station cell provided by base station 110. As such, in this example, electronic mobile device 102 is not able to register with base station 110. Electronic mobile device 102 includes country cell information scan logic 106 that is operably connected to country notification logic 108 via communication link 118. Country notification logic 108 is operably connected to country code range mapping logic 110 via communication link 120, and to service adjustment based on country determination logic 112 via communication links 114, 116.

Electronic mobile device 102 may also include memory device 130 which may be RAM, ROM, or any other suitable memory or non-transitory computer readable medium that may store executable code modules that when executed by one or more processors, such as optional processor 122, causes the one or more processors to operate as one or more functions of country cell information scan logic 106, country notification logic 108, country code range mapping logic 110, and service adjustment based on country determination logic 112. The one or more processor may be, for example, a central processing unit (CPU), a digital signal processor (DSP), a field programmable gate array (FPGA), an accelerated processing unit (APU), or any other suitable processor. For example, country cell information scan logic 106, country notification logic 108, country code range mapping logic 110, and service adjustment based on country determination logic 112 may be implemented as optional processor 122 operable to execute suitable instructions. However, it will be recognized that any suitable structure may be employed such as, but not limited to, application specific integrated circuits, digital signal processors, field programmable gate arrays, state machines, or any suitable combination of processors and/or discrete logic. Electronic mobile device 102 may also include known input/output devices 132 such as but not limited to touch pad interfaces, audible interfaces, and any other suitable input/output devices as desired. Electronic mobile device 102 may also include a known display device 134 such as a cellphone display, a touchscreen display, or any other suitable display.

Country cell information scan logic 106 is operable to scan at least one base station cell provided by base station 110 where the base station cell does not include a SIM profile that is compatible with the SIM profile of electronic mobile device 102. For example, in response to an inability to connect with a wireless network that is compatible with the electronic mobile device's 102 SIM profile, country cell information scan logic 106 may scan at least one base station cell associated with a second and different SIM profile. Country cell information scan logic 106 is also operable to obtain cell information in response to scanning the base station cell. Country notification logic 108 may be operable to obtain the cell information from country cell information scan logic 106 over, for example, communication link 118, and determine country associated data, such as MCC or SID data, that may be included in the obtained cell information. For example, country notification logic 108 may extract country associated data from the obtained cell information. Country notification logic 108 may then provide the country associated data to country code range mapping logic 110 over, for example, communication link 120.

Country code range mapping logic 110 may determine a range of country associated data that the obtained country associated data falls within. For example, country code range mapping logic 110 may determine a range of country associated data based on a country code map (e.g., a lookup table) that maps a plurality of ranges of country associated data to a particular country. Country code range mapping logic 110 may then determine the current country location of electronic mobile device 102 based on the country associated data range that the obtained country associated data falls within. A user's current country location is detected, used, or stored only after receiving explicit authorization from the user to do so. Country code range mapping logic 110 may provide the determined current country location to country notification logic 108. Country notification logic 108 may provide the current country location via, for example, a country notification over communication link 114 to service adjustment based on country determination logic 112. In other embodiments, country code range mapping logic 110 may determine a city, county, or any other geographical location of electronic mobile device 102 based on the country associated data range that the obtained country associated data falls within. For example, country code range mapping logic 110 may determine a range of country associated data based on a country code map (e.g., a lookup table) that maps a plurality of ranges of country associated data to various cities in a particular country. Country code range mapping logic 110 may then determine a current city location of electronic mobile device 102 based on the country associated data range that the obtained country associated data falls within.

Service adjustment based on country determination logic 112 may then adjust operation of at least one service of the electronic mobile device based on the determined current country location. In one example, country notification logic 108 provides the country notification when the determined country is different than a previously determined country. For example, country notification logic 108 may provide the country notification when the electronic mobile device 102 determines a new country. In another example, service adjustment based on country determination logic 112 provides a current country request requesting the current country over communication link 116. In response, country notification logic 108 provides a country notification, such as the last determined current country location.

Figure 2:
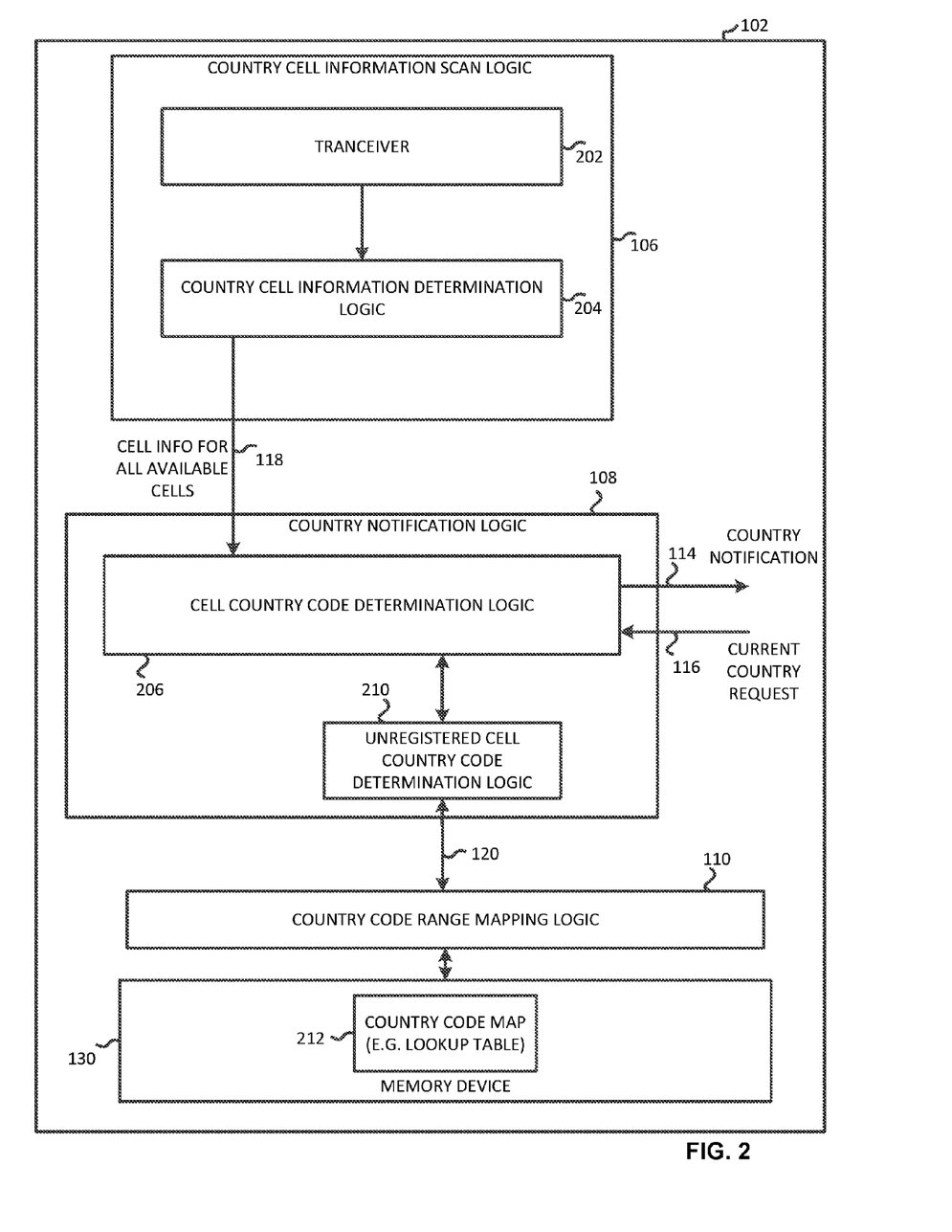
FIG. 2 is a block diagram illustrating a more detailed view of a country code map employed in the wireless communication device of FIG. 1 in accordance with one example set forth in the disclosure.

Referring to FIG. 2, a more detailed functional block diagram of various logic blocks of the electronic mobile device 102 is shown. In this example, the country cell information scan logic 106 includes a wireless transceiver 202, such as a cellular WWAN transceiver, that is operative to communicate with a wireless network using a SIM profile as known in the art. Wireless transceiver 202 is operable to scan one or more base station cells, such as ones provided by base station 110. Country cell information determination logic 204 is operable to obtain cell information from wireless transceiver 202 for one or more scanned base station cells, and determine country associated data based on the obtained cell information for the scanned base station cells. Country cell information determination logic 204 may then provide the determined country associated data for the one or more base station cells to country notification logic 108. In this example, country associated data is provided to cell country code determination logic 206 of country notification logic 108. If the country associated data, such as MCC or SID data, is received from a base station cell provided by a base station that electronic mobile device 102 is not registered with (e.g., incompatible SIM profiles), cell country code determination logic 206 provides the country associated data to unregistered cell country code determination logic 210. Unregistered cell country code determination logic 210 may determine the type of country associated data (e.g., MCC data, SID data), and may provide the country associated data and/or the type of country associated data to country code range mapping logic 110 over, for example, communication link 120.

Country code range mapping logic 110 may determine a current country location of electronic mobile device 102 based on the provided country associated data and/or type of country associated data. For example, country code range mapping logic 110 may determine the current country location of electronic mobile device 102 based on a country associated data range that the obtained country associated data falls within. For example, country code range mapping logic 110 may access country code map 212 stored in memory device 130. In this example, memory device 130 is a non-volatile memory, such as ROM, EEPROM, EPROM, or any other suitable non-volatile memory. As such, data within country code map 212 is not lost upon powering down electronic mobile device 102. Country code map 212 maps a plurality of ranges of country associated data to a particular country. For example, country code map 212 may map ranges of MCC data to one or more countries. Similarly, country code map 212 may map ranges of SID data to one or more countries. Because country code map 212 may store ranges of country associated data rather than all possible country associated data, memory space is conserved. Country code range mapping logic 110 may compare the provided country associated data to one or more ranges of country associated data of country code map 212. If the provided country associated data falls within a range of country associated data, country code range mapping logic 110 determines that the current country location of electronic mobile device 102 is the particular country mapped to that range of country associated data. A user's current country location is detected, used, or stored only after receiving explicit authorization from the user to do so. Unregistered cell country code determination logic 210 may then provide the determined current country location of electronic mobile device 102 to cell country code determination logic 206. Otherwise, if the country associated data is a country code, such as may be received from a base station cell provided by a base station with which electronic mobile device 102 is registered with, cell country code determination logic 206 may provide the country code directly as a country notification.

Figure 3:
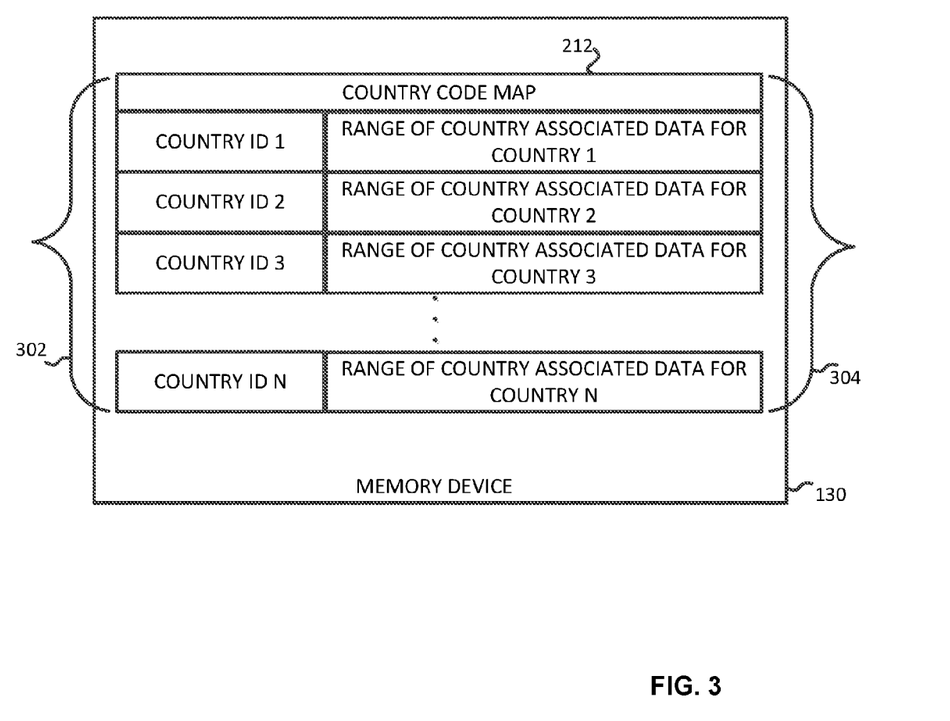
FIG. 3 is a block diagram illustrating one example of a country code map residing in memory in accordance with one example set forth in the disclosure.

FIG. 3 provides an example of a country code map, such as country code map 212 of FIG. 2. As shown, country code map 212 resides in memory device 130, and includes a plurality of country identifications (IDs) 302 as well as a plurality of ranges of country associated data 304 for each country ID 302. For example, country ID 1 is associated with a range of country associated data for country 1, country ID 2 is associated with a range of country associated data for country 2, and so on. As described above, country code range mapping logic 110 may determine, based on country code map 212, a range of country associated data that an obtained country associated data falls within. In one example, country code range mapping logic 110 determines the range of country associated data that an obtained country associated data falls within by comparing the obtained country associated data to one or more ranges of country associated data 304. If the obtained country associated data falls within a range of country associated data 304 for a particular country, country code range mapping logic 110 provides the country ID 302 to country notification logic 108. Although this figure shows one example of a country code map 212 that maps a plurality of ranges of country associated data to a particular country, it is to be appreciated that there are other examples of structuring the country code map 212 as would be recognized by those of ordinary skill in the art.

Figure 4:
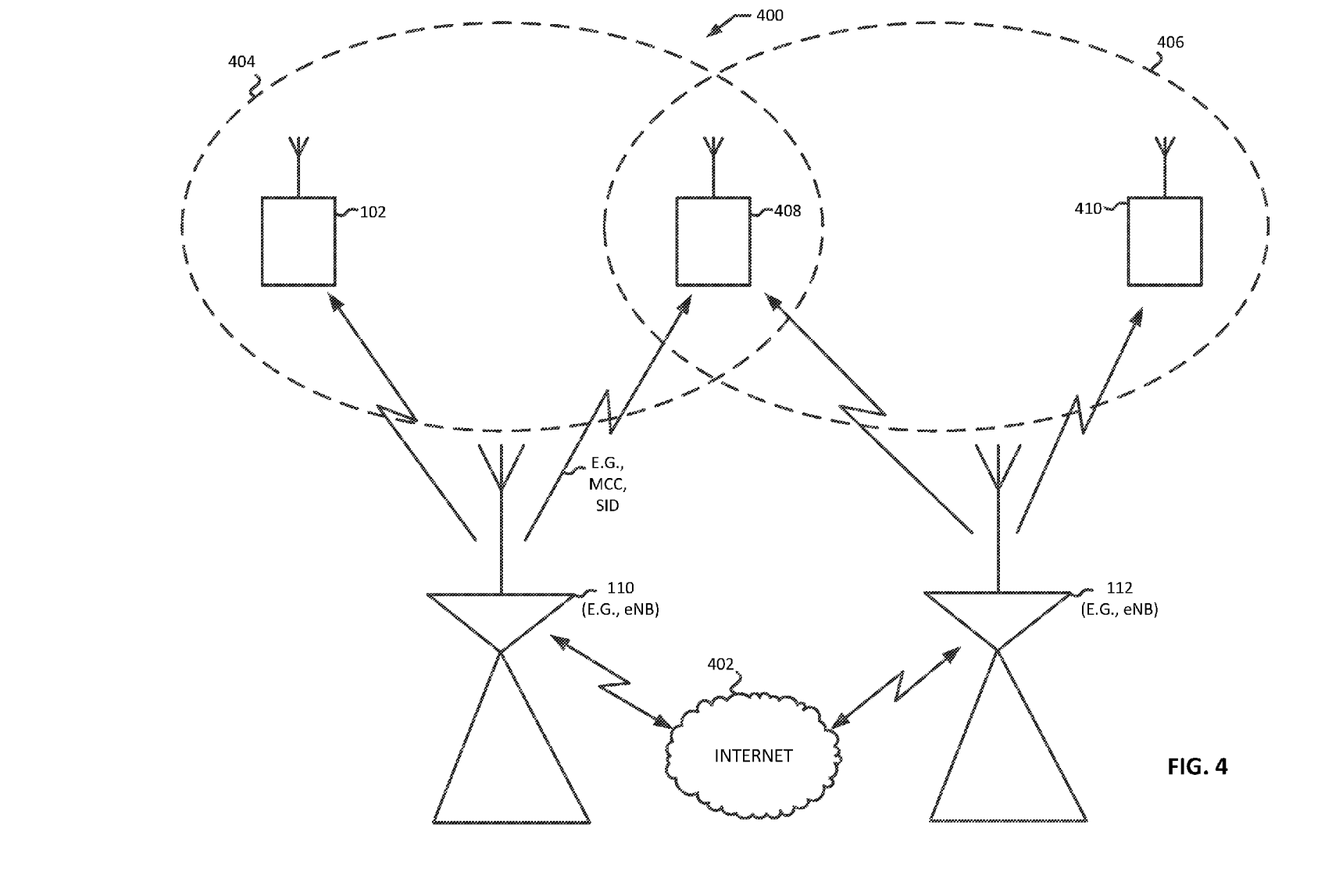
FIG. 4 is a block diagram generally illustrating one example of a communication environment employing multiple wireless communication devices and multiple base stations in accordance with one example set forth in the disclosure.

FIG. 4 is a block diagram illustrating one example of a communication environment 400 employing multiple electronic mobile devices 102, 408, 410 and multiple base stations 110, 412. As shown in the figure, base station 110 provides a base station cell 404, and base station 112 provides base station cell 406. Each base station may be operably connected to the Internet 402 as is known in the art. In one example, one or more of electronic mobile devices 102, 408, 410 include a SIM profile that is compatible with a SIM profile associated with a base station cell 404, 406 provided by base stations 110, 112. As such, one or more of electronic mobile devices 102, 408, 410 may connect to and register with a base station cell 404, 406 associated with a compatible SIM profile. In this example, one or more of electronic mobile devices 102, 408, 410 are operable to receive country associated data (e.g., a list of MCCs and/or SIDs) for a plurality of countries from a server accessible over the Internet. Electronic mobile devices 102, 408, 410 may generate a country code map, such as country code map 212, based on the received country associated data. For example, one or more of electronic mobile devices 102, 408, 410 may obtain MCC data for a plurality of countries from a server accessible over the Internet, and generate a country code map that maps a plurality of ranges of MCC data to a particular country. Similarly, one or more of electronic mobile devices 102 may obtain SID data for a plurality of countries from a server accessible over the Internet, and generate a country code map that maps a plurality of ranges of SID data to a particular country.

In another example, electronic mobile devices 102, 408, 410 may connect to a WLAN, such as a Wi-Fi network, providing Internet access. In this example, electronic mobile devices 102, 408, 410 may obtain country associated data for a plurality of countries from a server accessible over the Internet. Electronic mobile devices 102, 408, 410 may generate a country code map, such as country code map 212, based on the received country associated data.

In one example, one or more of electronic mobile devices 102, 408, 410 do not include a SIM profile that is compatible with a SIM profile of a base station cell 404, 406 provided by base stations 110, 112. In this example, electronic mobile devices 102, 408, 410 are operable to scan one or more base station cells 404, 406 provided by base stations 110. For example, as indicated in the figure, electronic mobile device 408 may be in an area covered by both base station cell 404 and base station cell 406. Electronic mobile device 408 may scan both base station cell 404 and base station cell 406 to obtain cell information from each base station cell. Electronic mobile device 408 may determine country associated data for each base station cell 404, 406 based on cell information obtained from each of the base station cells. For example, the electronic mobile device 102 may determine MCC data or SID data for each base station cell 404, 406. The electronic mobile device 102 may then determine at least one country for each base station cell 404, 406 based on the country associated data for each base station cell 404, 406. For example, one country may be determined based on country associated data obtained from base station cell 404, while a second and different country may be determined based on country associated data obtained from base station cell 406. Alternatively, the same country may be determined based on country associated data obtained from base station cell 404 and base station 406. The electronic mobile device 102 may determine that a particular country is a country with a highest number of determined country associated data associated with that particular country. For example, the electronic mobile device 102 may determine that a particular country was determined more often than another particular country. In another example, the electronic mobile device 102 may determine that a particular country is the only country determined, and thus is the most often determined country. Electronic mobile device 102 may determine that its current country location is the most often determined country.

Figure 5:
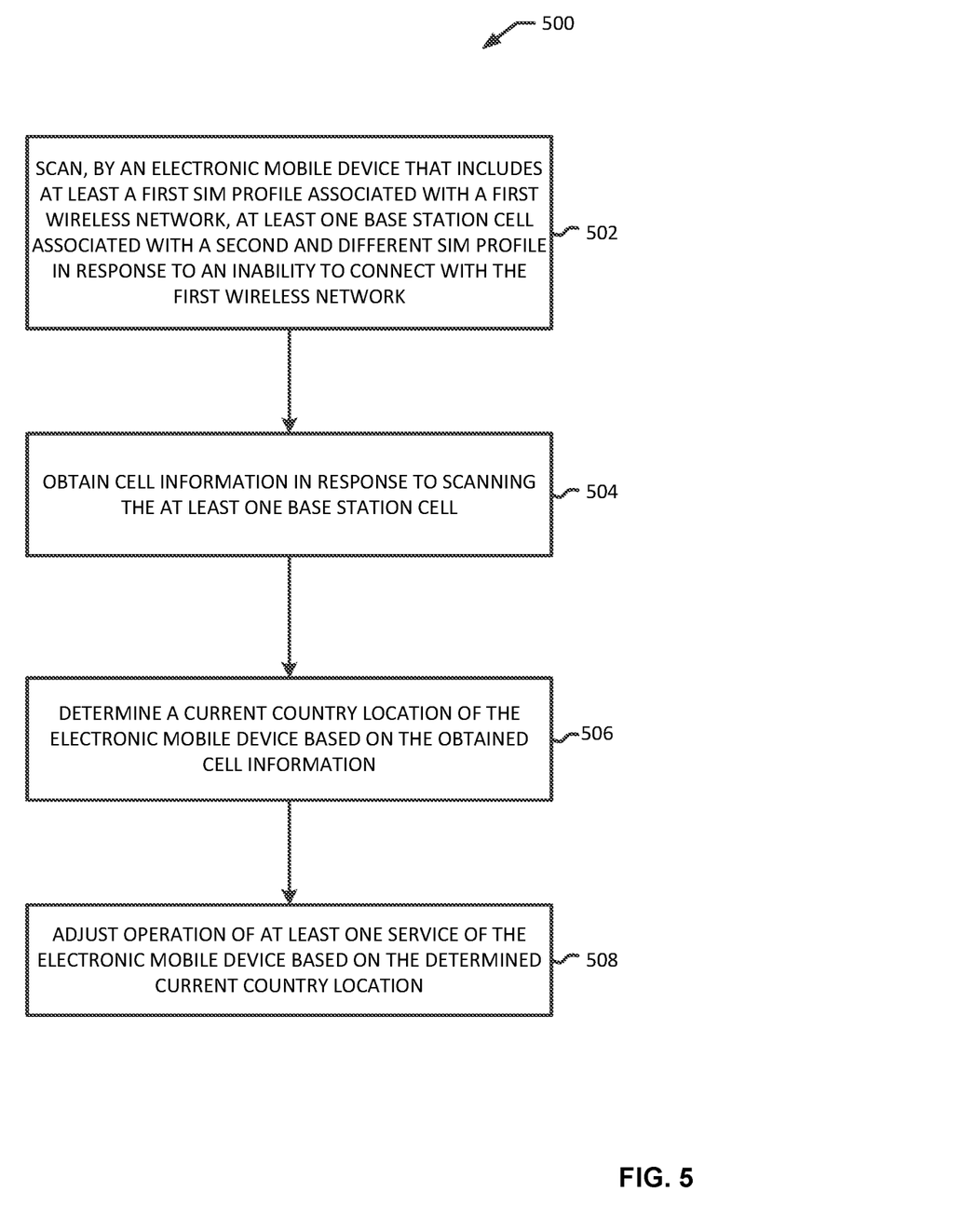
FIG. 5 is a flowchart illustrating one example of a method by an electronic mobile device in accordance with one example set forth in the disclosure.

Referring to FIG. 5, a method 500 of operation of the electronic mobile device 102 will be described. At block 502, an electronic mobile device that includes a first SIM profile associated with a first wireless network, scans at least one base station cell associated with a second and different SIM profile in response to an inability to connect with the first wireless network. For example, although the electronic mobile device includes a SIM profile compatible with the first wireless network, the first wireless network may not be currently available (e.g., the electronic mobile device is in an area not served by base station cells compatible with its SIM profile). In response, the electronic mobile device scans a base station cell associated with a different SIM profile, even though the electronic device is unable to register with that base station cell.

At block 504, the electronic mobile device obtains cell information in response to scanning the base station cell. For example, the electronic mobile device may obtain cell information including country associated data such as MCC or SID data. At block 506, the electronic mobile device determines its current country location based on the obtained cell information. A user's current country location is detected, used, or stored only after receiving explicit authorization from the user to do so. At block 508, the electronic mobile device adjusts operation of at least one of its services based on the determined current country location. For example, an application executed by the electronic mobile device may display the country, or may display rate notifications, such as calling rates or data rates.

Figure 6:
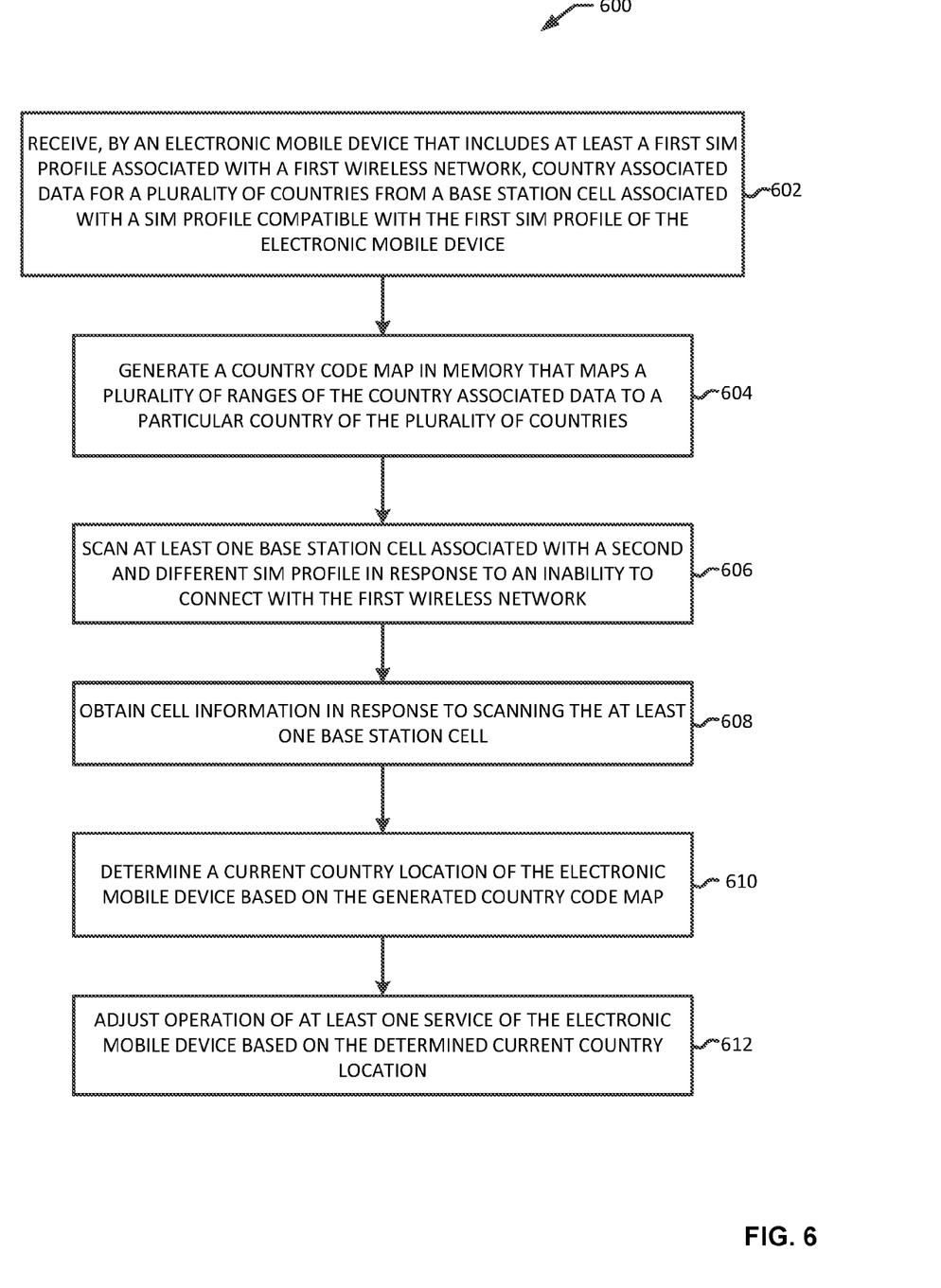
FIG. 6 is a flowchart illustrating another example of a method by an electronic mobile device in accordance with one example set forth in the disclosure.

FIG. 6 describes another example of a method 600 of operation of the electronic mobile device 102. At block 602, an electronic mobile device that includes a first SIM profile associated with a first wireless network receives country associated data for a plurality of countries from a base station cell associated with a SIM profile compatible with the SIM profile of the electronic mobile device. For example, because the SIM profiles of the electronic mobile device and the base station cell are compatible, the electronic mobile device may connect to and register with the base station providing the base station cell. The base station providing the base station cell may provide access to the Internet to registered devices. As such, the electronic device may obtain country associated data, such as MCC data or SID data, for a plurality of countries from an Internet accessible server.

At block 604 the electronic mobile device generates a country code map in memory based on, for example, the obtained country associated data. The country code map maps a plurality of ranges of the country associated data to a particular country. For example, the country code map may map MCC ranges to a particular country. Similarly, the country code map may map SID ranges to a particular country. At block 606, the electronic mobile device scans at least one base station cell associated with a second and different SIM profile in response to an inability to connect with a first wireless network. At block 608, the electronic mobile device obtains cell information in response to scanning the base station cell. The method proceeds to block 610, where the electronic mobile device determines its current country location based on the obtained cell information. A user's current country location is detected, used, or stored only after receiving explicit authorization from the user to do so. At block 612, the electronic mobile device adjusts operation of at least one of its services based on the determined current country location. For example, the electronic mobile device may change a time of day displayed to be consistent with the time of day in the determined current country location. In another example, the electronic mobile device may display the country associated with the determined current country location. In yet another example, the electronic mobile device may adjust calendar events based on the determined current country location (e.g., calendar events may be adjusted such that they now appear under a day and time in the calendar corresponding to the current country location).

Figure 7:
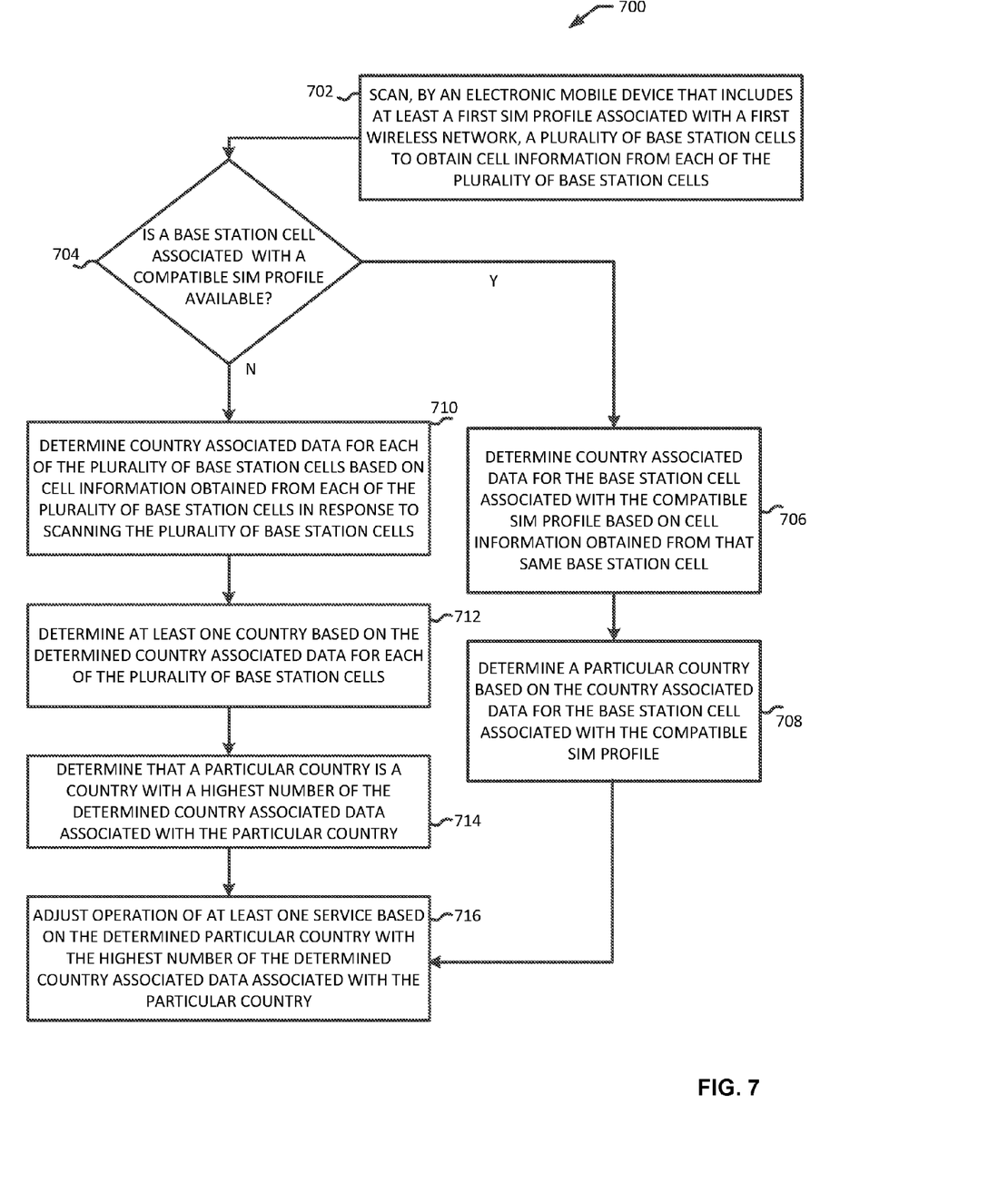
FIG. 7 is a flowchart illustrating another example of a method by an electronic mobile device in accordance with one example set forth in the disclosure.

FIG. 7 describes yet another example of a method 700 of operation of electronic mobile device 102. At block 702, an electronic mobile device, that includes at least a first SIM profile associated with a first wireless network, scans a plurality of base station cells to obtain cell information from each of the plurality of base station cells. The method proceeds to decision block 704 where a determination is made as to whether one of the scanned base station cells is associated with a SIM profile that is compatible with (e.g., matches) the electronic mobile device's first SIM profile. If none of the scanned base station cells is associated with a SIM profile that is compatible with the electronic mobile device's first SIM profile, the method proceeds to block 710.

At block 710, the electronic mobile device 102 determines country associated data for each base station cell based on the cell information obtained from each of the base station cells, respectively. For example, electronic mobile device 102 may determine that the obtained cell information for each base station cell includes MCC data or SID data. The method then proceeds to block 712, where the electronic mobile device 102 determines at least one country for each base station cell based on the determined country associated data for each base station cell. For example, one country may be determined based on country associated data obtained from one base station cell, while a second and different country may be determined based on country associated data obtained from a different base station cell. Alternatively, the same country may be determined based on country associated data obtained from both the first and second base station cells. At block 714, the electronic mobile device 102 determines that a particular country is a country with a highest number of determined country associated data associated with that particular country. For example, electronic mobile device 102 may determine that a particular country was determined more often than another particular country. In another example, electronic mobile device 102 may determine that a particular country is the only country determined, and thus is the most often determined country. A user's current country location is detected, used, or stored only after receiving explicit authorization from the user to do so. The method then proceeds to block 716, where the electronic mobile device adjusts operation of at least one of its services based on the determined particular country.

If, at decision block 704, a determination is made that at least one scanned base station cell is associated with a SIM profile that is compatible with the electronic mobile device's first SIM profile, the method proceeds to block 706. At block 706, the electronic mobile device determines country associated data for the base station cell that is associated with a SIM profile that is compatible with the electronic mobile device's first SIM profile. For example, because the SIM profile of the electronic mobile device is compatible with the base station cell's associated SIM profile, the electronic mobile device may be registered with the base station cell and obtain a country code as part of the obtained cell information. The method then proceeds to block 708, where the electronic mobile device determines a particular country based on the country associated data (e.g., country code) for that base station cell. A user's current country location is detected, used, or stored only after receiving explicit authorization from the user to do so. The method then proceeds to block 716.

Among other advantages, an electronic mobile device may determine a current country location even while not connected to and registered with a base station. Moreover, detection of the current country location does not require Internet connectivity, as the determination is based on information obtained from a base station cell. As another advantage, the described approaches to detecting a current country location of an electronic mobile device require little additional power (e.g., battery power) as electronic mobile devices typically scan base station cells for other reasons. In addition, a current country location may be detected as quickly as a base station cell scan is performed, where a scan may be performed multiple times within a minute. Persons of ordinary skill in the art would recognize other advantages as well.

In situations in which the systems and methods discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The above detailed description and the examples described therein have been presented for the purposes of illustration and description only and not for limitation. For example, the operations described may be done in any suitable manner. Although features and elements are described above in particular combinations, each feature or element can be used alone without the other features and elements or in various combinations with or without other features and elements. Moreover, the methods may be done in any suitable order while still providing the described operations and results. It is therefore contemplated that the present embodiments cover any and all modifications, variations, or equivalents that fall within the spirit and scope of the basic underlying principles disclosed above and claimed herein. Furthermore, while examples in the above description describe hardware in the form of a processor executing code, hardware in the form of a state machine, or dedicated logic capable of producing the same effect, are also contemplated.

What is claimed is:

1. A computer-executed method in an electronic mobile device that includes at least a first subscriber identification module (SIM) profile associated with a first wireless network comprising:
    scanning, by the electronic mobile device that includes the first SIM profile associated and compatible with the first wireless network and based on the first SIM profile, at least one base station cell associated and compatible with a second SIM profile that is different than the first SIM profile;
    determining that the electronic mobile device, based on the first SIM profile, is unable to connect with the first wireless network;
    obtaining, based on the first SIM profile while the electronic mobile device is not connected to the first wireless network, cell information in response to scanning the at least one base station cell associated with the second and different SIM profile;
    determining a current geographic location of the electronic mobile device based on the cell information obtained from the at least one base station cell associated with the second and different SIM profile; and
    adjusting operation of at least one service of the electronic mobile device based on the determined current geographic location.

2. The method of claim 1 wherein determining the current geographic location of the electronic mobile device based on the cell information obtained from the base station cell associated with the second and different SIM profile comprises:
    receiving country associated data for a plurality of countries from a base station cell with a SIM profile compatible with the at least first SIM profile;
    generating a country code map that maps a plurality of ranges of the country associated data to a particular country of the plurality of countries; and
    determining, while the electronic mobile device is not connected to the first wireless network, the current geographic location of the electronic mobile device based on the generated country code map that maps the range of country associated data to a particular country of the plurality of countries.

3. The method of claim 2 wherein determining, while the electronic mobile device is not connected to the first wireless network, the current geographic location of the electronic mobile device based on the generated country code map that maps the range of country associated data to a particular country of the plurality of countries comprises:
    accessing the country code map that maps the plurality of ranges of country associated data to a particular country of the plurality of countries in memory;
    comparing the obtained cell information to at least one range of the plurality of ranges of country associated data mapped by the country code map; and
    determining the current geographic location based on the comparison of the obtained cell information to the at least one range of the plurality of ranges of country associated data mapped by the country code map.

4. The method of claim 3 wherein determining the current geographic location based on the comparison of the obtained cell information to the at least one range of the plurality of ranges of country associated data mapped by the country code map comprises determining that the obtained cell information falls within the at least one range of the plurality of ranges of country associated data.

5. The method of claim 1 wherein adjusting the operation of the at least one service of the electronic mobile device based on the determined current geographic location of the electronic mobile device comprises:
    notifying the at least one service of the determined current geographic location of the electronic mobile device;
    storing an indication of the determined current geographic location of the electronic mobile device in memory; and
    adjusting the operation of the at least one service of the electronic mobile device, while the electronic mobile device is not connected to the first wireless network, using the stored indication of the determined current geographic location of the electronic mobile device.

6. The method of claim 1 wherein determining the current geographic location of the electronic mobile device based on the cell information obtained from the base station cell associated with the second and different SIM profile comprises:
    determining that the cell information obtained from the base station cell associated with the second and different SIM profile comprises Mobile Country Code (MCC) data; and
    determining the current geographic location of the electronic mobile device based on the MCC data.

7. The method of claim 1 wherein determining the current geographic location of the electronic mobile device based on the determined country associated data comprises:

determining that the cell information obtained from the base station cell associated with the second and different SIM profile comprises System Identification (SID) data; and determining the current geographic location of the electronic mobile device based on the SID data.

8. An electronic mobile device comprising:

at least a first subscriber identification module (SIM) profile associated and compatible with a first wireless network;

country cell information scan logic operative to:

scan, based on the first SIM profile, at least one base station cell associated and compatible with a second SIM profile that is different than the first SIM profile;

determine, based on the first SIM profile, that the electronic mobile device is unable to connect with the first wireless network;

obtain, based on the first SIM profile while the electronic mobile device is not connected to the first wireless network, cell information in response to scanning the at least one base station cell associated with the second and different SIM profile;

country change notification logic operatively coupled to the country cell information scan logic and operative to determine a current geographic location of the electronic mobile device based on the cell information obtained from the at least one base station cell associated with the second and different SIM profile; and service adjustment based on country determination logic operatively coupled to the country change notification logic and operative to adjust operation of at least one service of the electronic mobile device based on the determined current geographic location.

9. The electronic mobile device of claim 8 wherein the country change notification logic is operable to:

receive country associated data for a plurality of countries from a base station cell with a SIM profile compatible with the at least first SIM profile;

generate a country code map that maps a plurality of ranges of the country associated data to a particular country of the plurality of countries; and determine, while the electronic mobile device is not connected to the first wireless network, the current geographic location of the electronic mobile device based on the generated country code map that maps the range of country associated data to a particular country of the plurality of countries.

10. The electronic mobile device of claim 9 comprising a memory that is operable to store the country code mapping, wherein the country change notification logic is operable to:

access the country code map that maps the plurality of ranges of country associated data to a particular country of the plurality of countries in the memory;

compare the obtained cell information to at least one range of the plurality of ranges of country associated data mapped by the country code map; and determine the current geographic location based on the comparison of the obtained cell information to the at least one range of the plurality of ranges of country associated data mapped by the country code map.

11. The electronic mobile device of claim 10 wherein the country change notification logic is operable to determine that the obtained cell information falls within the at least one range of the plurality of ranges of country associated data.

12. The electronic mobile device of claim 8 wherein the service adjustment based on country determination logic is operable to:

notify the at least one service of the determined current geographic location of the electronic mobile device;

store an indication of the determined current geographic location of the electronic mobile device in memory; and adjust the operation of the at least one service of the electronic mobile device, while the electronic mobile device is not connected to the first wireless network, using the stored indication of the determined current geographic location of the electronic mobile device.

13. The electronic mobile device of claim 8 wherein the country change notification logic is operable to:

determine that the determined country associated data comprises Mobile Country Code (MCC) data; and determine the particular country based on the MCC data.

14. The electronic mobile device of claim 8 wherein the country change notification logic is operable to:

determine that the determined country associated data comprises System Identification (SID) data; and determine the particular country based on the SID data.

15. A non-transitory computer readable medium comprising executable instructions that when executed by one or more processors of an electronic mobile device that includes at least a first subscriber identification module (SIM) profile associated with a first wireless network cause the one or more processors to:

scan, by the electronic mobile device that includes the first SIM profile associated and compatible with the first wireless network and based on the first SIM profile, at least one base station cell associated and compatible with a second SIM profile that is different than the first SIM profile;

determine that the electronic mobile device, based on the first SIM profile, is unable to connect with the first wireless network;

obtain, based on the first SIM profile while the electronic mobile electronic device is not connected to the first wireless network, cell information in response to scanning the at least one base station cell associated with the second and different SIM profile;

determine a current geographic location of the electronic mobile device based on the cell information obtained from the at least one base station cell associated with the second and different SIM profile; and adjust operation of at least one service of the electronic mobile device based on the determined current geographic location.

16. The non-transitory computer readable medium of claim 15 wherein the executable instructions, when executed by the one or more processors, cause the one or more processors to:

receive country associated data for a plurality of countries from a base station cell with a SIM profile compatible with the at least first SIM profile;

generate a country code map that maps a plurality of ranges of the country associated data to a particular country of the plurality of countries; and determine, while the electronic mobile device is not connected to the first wireless network, the current geographic location of the electronic mobile device based on the generated country code map that maps the range of country associated data to a particular country of the plurality of countries.

17. The non-transitory computer readable medium of claim 16 wherein the executable instructions, when executed by the one or more processors, cause the one or more processors to:

access the country code map that maps the plurality of ranges of country associated data to a particular country of the plurality of countries in the memory;

compare the obtained cell information to at least one range of the plurality of ranges of country associated data mapped by the country code map; and determine the current geographic location based on the comparison of the obtained cell information to the at least one range of the plurality of ranges of country associated data mapped by the country code map.

18. The non-transitory computer readable medium of claim 15 wherein the executable instructions, when executed by the one or more processors, cause the one or more processors to:

notify the at least one service of the determined current geographic location of the electronic mobile device;

store an indication of the determined current geographic location of the electronic mobile device in memory; and adjust the operation of the at least one service of the electronic mobile device, while the electronic mobile device is not connected to the first wireless network, using the stored indication of the determined current geographic location of the electronic mobile device.

19. The non-transitory computer readable medium of claim 15 wherein the executable instructions, when executed by the one or more processors, cause the one or more processors to:

determine that the determined country associated data comprises Mobile Country Code (MCC) data; and determine the particular country based on the MCC data.

20. The non-transitory computer readable medium of claim 15 wherein the executable instructions, when executed by the one or more processors, cause the one or more processors to:

determine that the determined country associated data comprises System Identification (SID) data; and determine the particular country based on the SID data.

* * * * *